United States Patent [19]

Tokumitsu et al.

[11] Patent Number: 5,526,044
[45] Date of Patent: Jun. 11, 1996

[54] MOVEMENT DETECTION DEVICE AND FOCUS DETECTION APPARATUS USING SUCH DEVICE

[75] Inventors: Jun Tokumitsu, Sagamihara; Masayoshi Sekine, Tokyo; Toshiaki Kondo, Atsugi; Koji Takahashi; Isao Harigaya, both of Yokohama; Minoru Yoshii, Tokyo; Shigeyuki Suda, Yokohama, all of Japan

[73] Assignee: Canon Kabushiki Kaisha, Tokyo, Japan

[21] Appl. No.: 161,444

[22] Filed: Dec. 6, 1993

Related U.S. Application Data

[63] Continuation of Ser. No. 983,277, Nov. 30, 1992, abandoned, which is a continuation of Ser. No. 691,785, Apr. 26, 1991, abandoned.

[30] Foreign Application Priority Data

Apr. 29, 1990 [JP] Japan .................... 2-112663
Apr. 29, 1990 [JP] Japan .................... 2-112664

[51] Int. Cl.⁶ .................................. H04N 5/228
[52] U.S. Cl. .......................... 348/208; 348/700
[58] Field of Search ................. 354/430, 69, 70; 348/207, 208, 152, 155, 109, 699, 700; 359/554; H04N 5/228

[56] References Cited

U.S. PATENT DOCUMENTS 4,612,575  9/1986  Ishman et al. ................ 358/160
5,012,270  4/1991  Sekine et al. ................. 354/430
5,020,890  6/1991  Oshima et al. ............... 358/222
5,107,293  4/1992  Sekine et al. ................. 354/430

FOREIGN PATENT DOCUMENTS 0358196   3/1990   European Pat. Off. ......... G02B 27/64
0366136   5/1990   European Pat. Off. ......... H04N 5/225
3243486   5/1984   Germany ..................... H04N 1/04
63-166370 11/1988   Japan ....................... H04N 5/232
1-212077  11/1989   Japan ....................... H04N 5/21

Primary Examiner—Wendy R. Greening
Assistant Examiner—Tuan V. Ho
Attorney, Agent, or Firm—Fitzpatrick, Cella, Harper & Scinto

[57] ABSTRACT

A movement detection device for detecting movement of an image incident on an image sensing device and for compensating for that movement includes movement detection circuitry for detecting the movement of the image from image signals output from the image sensing device. Correction circuitry is provided for electrically correcting the movement of the image based on an output of the movement detection circuitry. A filter is provided for receiving the corrected image signals output from the correction circuitry, and for performing a filter processing operation on the corrected image signals to compensate for degradation of image resolution due to the movement of the image.

24 Claims, 11 Drawing Sheets

MOVEMENT DETECTION DEVICE AND FOCUS DETECTION APPARATUS USING SUCH DEVICE

This application is a continuation of application Ser. No. 07/983,277 filed Nov. 30, 1992, which is a continuation of Ser. No. 07/691,785, filed Apr. 26, 1991, both now abandoned.

BACKGROUND OF THE INVENTION

1. Field of the Invention

The present invention relates to a movement detection device suitable for use with (i) a camera having a vibration-proof device for compensating for the movement of an image being picked-up by the camera due to trembling of the hand or other vibrations, (ii) an automatic tracking apparatus for tracking a moving object, or (iii) an automatic focus detection apparatus for detecting a focusing state from an image pick-up signal.

2. Related Background Art

Recently, image instruments such as a video camera or electronic camera have been remarkably developed in which, to enable a more reliable and appropriate photographing operation, a movement correction device has been adopted which allows the photographing of higher quality images without fluctuation by correcting the movement of the image due to trembling of the hand or other vibrations.

The movement correction method for the movement correction device involves (i) a mechanical correction method of using inertia to maintain the axes of the lens and image sensor fixed against the rotation of camera body, (ii) an optical correction method of using an optical member such as a variable apex angle prism, and (iii) an image processing correction method for making the correction by moving the image with image processing.

According to the mechanical correction method, a special structure for supporting the lens and a pick-up system is required. According to the optical correction method, a special optical member such as a variable apex prism is required, while in the image processing correction method, no special mechanical structure or optical members are necessary. In the image processing correction method, the movement is corrected only with signal processing using electrical circuitry, and this method is expected to be widely used in the future.

However, the movement correction device with the above-mentioned conventional image processing method has the following disadvantage, compared with the mechanical or optical device. That is, in performing the movement correction with the image processing method, an image has some movement at the pick-up stage (with an image sensor or pick-up tube), whereby in the post-pick-up processing, the movement of the image within an image screen is removed by shifting the image in accordance with the amount of image movement.

Thus, as the image obtained in the pick-up stage yields some unfocused portions, final resolution of the image is low even if the movement of the image is corrected in the post-pick-up processing, so that a poor quality of image is output.

Recently, in video instruments such as a video camera or an electronic camera, an automatic focusing adjustment apparatus for adjusting the focus by detecting the focusing state from a pick-up signal has been adopted, but as above described, the movement of the image may reduce a high frequency component varied with the focusing state from the pick-up signal, thereby decreasing the sharpness, and degrading the performance of automatic focusing adjustment apparatus, whereby there is a risk of a malfunction. Thus, it is quite important to detect and correct the movement of the image in the signal processing using the pick-up signal.

SUMMARY OF THE INVENTION

The present invention is intended to resolve the above problems, and it is a first object to provide a movement detection device which can compensate for the degradation of resolution due to the movement of the image.

A second object of the present invention is to provide a movement detection device capable of providing an image without fluctuation or deflection and having high resolution, with the movement corrected, and which can compensate for the degradation of resolution with the movement of the image by means of filtering.

A third object of the present invention is to provide a movement detection device capable of providing a high quality image (with its movement corrected) by performing filtering adaptively by the use of a movement vector of the image obtained from a movement amount detection device especially useful for the correction of movement.

A fourth object of the present invention is to provide a movement detection device having the effect of providing a high quality image by compensating for the degradation of image quality resulting from the movement of the image by means of filtering, and increasing the resolution of the output image for a movement correction device.

A fifth object of the present invention is to provide a movement detection device in which the quality of the image can be made excellent, almost optimal, without an increase of the cost, by changing adaptively the characteristics of a filter used in the filtering processing, particularly based on a movement vector to be obtained for the correction of movement.

To achieve such objects, a preferred embodiment of the present invention features a movement detection device for detecting the movement of an image and compensating for the movement of the image, comprising movement detection means for detecting a movement of an image, correction means for correcting the movement of the image based on an output of said detection means, and filter means for performing a filtering processing compensating for degradation of resolution with the movement of the image.

A sixth object of the present invention is to provide a focus detection apparatus capable of making a high precision focus detection while avoiding the decrease of accuracy due to the movement of the image, wherein the movement of the image is detected and the focus detection is made using a signal for which the degradation of the resolution with the movement of the image has been compensated.

A seventh object of the present invention is to provide a stable focus detection apparatus with high precision at all times, in which the apparatus is not subject to the influence of camera vibration or object movement because it is possible to prevent the degradation of accuracy in focus detection means caused by a signal decreasing in accordance with the focusing state, such as unclearness of an edge portion or a decrease of the high frequency component owing to the movement of the image.

To accomplish such objects, a preferred embodiment of the present invention features a focus detection apparatus for detecting a focusing state based on a pick-up signal output from pick-up means, comprising movement detection means for detecting a movement of an image from the pick-up signal, movement correction means for correcting the movement of the image based on an output of the movement detection means, and focus detection means for performing focus detection by extracting a signal component varying with the focusing state from the pick-up signal having its movement component corrected by the movement correction means.

Additional objects and feature of the present invention will become apparent from the following description and the accompanying drawings.

DETAILED DESCRIPTION OF THE PREFERRED EMBODIMENTS

An embodiment of a movement correction device according to the present invention will be described in detail with reference to the drawings.

Figure 1:
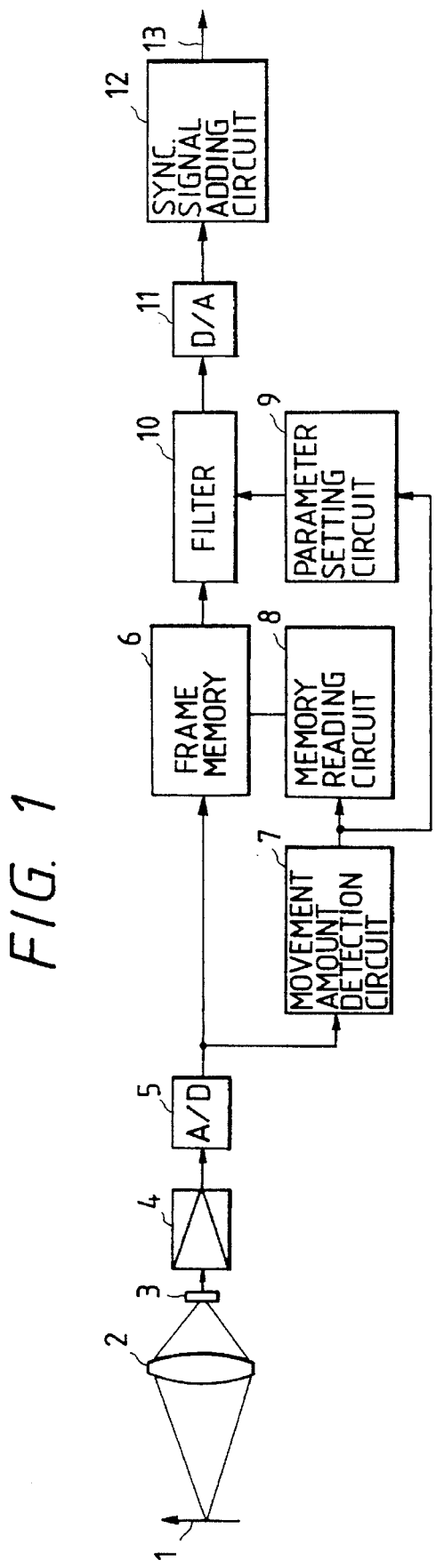
FIG. 1 is a block diagram showing a first example of a movement detection device according to the present invention.

FIG. 1 is a block diagram showing a first embodiment of a movement correction device according to the present invention.

In FIG. 1, 1 is an object, 2 is a pick-up lens, and 3 is a pick-up element (or pick-up tube) such as a CCD for outputting a pick-up signal by photoelectrically converting an object image formed on a pick-up plane by the pick-up lens 2. 4 is an amplifier for amplifying the pick-up signal output from the pick-up element 3 to a predetermined level, 5 is an A/D converter for converting the input analog pick-up signal to a digital signal, 6 is a frame memory for storing the image signal converted into the digital signal by the A/D converter 5, and 7 is a movement amount detection circuit for obtaining a movement vector from the image signal which has been converted from analog to digital form. Exemplary of a method of calculating the movement vector is that method used in a so-called representative point matching method or gradient method. 8 is a memory reading circuit for reading an image signal form the frame memory 6 by generating a read address and executing the reading.

9 is a parameter setting circuit for setting parameters for prevention of image degradation, and 10 is a filter.

11 is a D/A converter for converting the digital image signal passing through the filter 10 to an analog image signal, 12 is a synchronism signal adding circuit for adding a synchronism signal of the image signal, and 13 is an output video signal.

The pick-up leans 2 forms an image of object 1 on the pick-up plane of pick-up element 3. The image on the pick-up element 3 includes movements owing to the movement of the lens 2, pick-up element 3, or object 1. The image signal output from the pick-up element 3 is amplified by the amplifier 4, converted to the digital signal by the A/D converter 5, and then stored in the frame memory 6, temporarily.

The digital image signal which is an output of A/D converter 5 is also transferred to the movement amount detection circuit 7. Movement vector data obtained by the movement amount detection circuit 7 are transferred to the memory reading circuit 8 and the parameter setting circuit 9.

The movement detection circuit 7 requires data of an image screen of one frame or one field prior to the current screen for calculating the amount of movement, thereby requiring a frame memory. This frame memory may be constructed in common with the frame memory 6, or separately provided.

The memory reading circuit 8 creates the address for reading the frame memory 6 multiplied by the offset based on movement vector data. Thereby, data read from the frame memory 6 are read out in such a way so as to move data almost reversely to the movement of the image, so that the movement of the image can be corrected. That is, the correction of image deflection can be achieved in the memory.

The parameter setting circuit 9 determines parameters such as filter coefficients based on the movement vector obtained from the movement amount detection circuit 7, and sends them to the filter 10. The filter 10 filters the image signal having the corrected movement read from the frame memory 6, so as to reduce the unfocused part resulting from the movement of the image on the pick-up element 3, i.e., the degradation of resolution.

Also, the filter 10 has the characteristics of a high-pass filter and a band-pass filter, as will be described later.

The image signal output from the filter 10 is converted to an analog signal by the D/A converter 11, synthesized with a synchronism signal by the synchronism signal adding circuit 12, and output as the video signal 13.

The improvement of resolution with the filtering will be described in the following.

Figure 2:
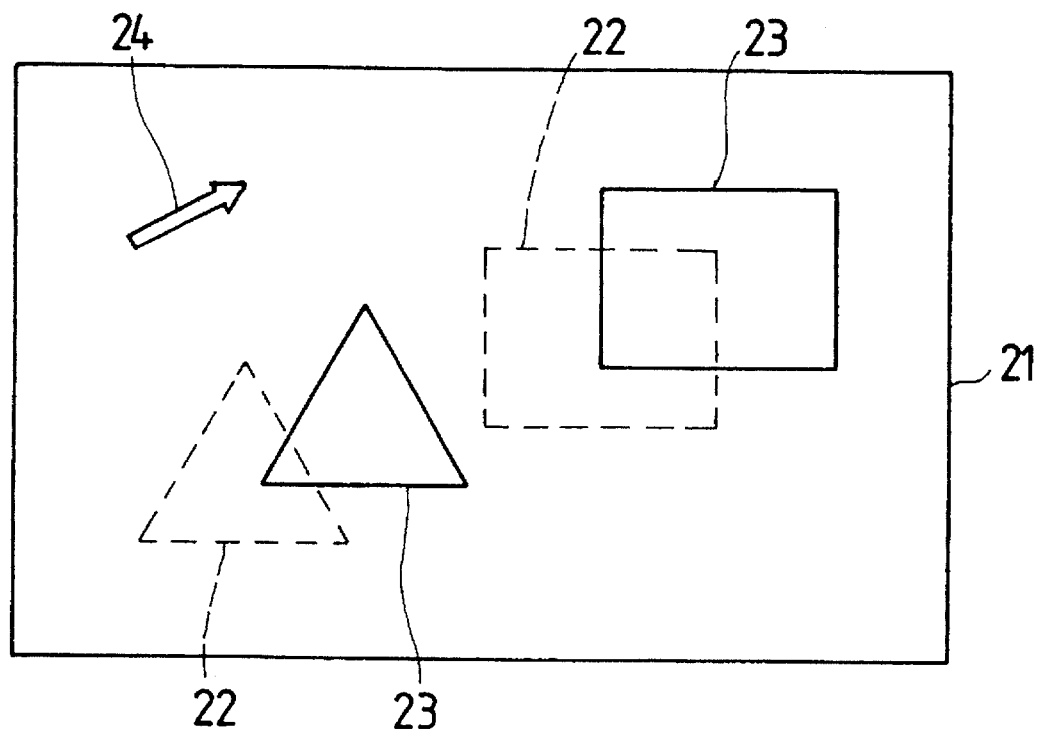
FIG. 2 is a view showing the movement of an image.

FIG. 2 is a plan view showing the movement of an image.

21 is an output screen. The output screen 21 has a fixed coordinate system which is useful as a reference to perform the processing such as vibration isolation. Here, a monitor display screen can be assumed, for example.

22 is a previous image, and 23 is a current image. 24 is a movement vector when the previous image 22 moves to the current image 23.

In the output screen 21, a video signal 13 of FIG. 1 is displayed. For example, an image displayed with trembling of the hand shows the movement from previous image 22 to current image 23 if time has passed from one clock to another when the object 1 is stationary.

With the movement correction method in the image processing, the movement correction is performed in such a manner that the movement vector 24 is calculated in the movement amount detection circuit 7, data is shifted by the amount of movement vector 24 on the output screen 21 when date of current image 23 is read from the frame memory 6, and the offset is added to the read address so that current image 23 can be superimposed almost on previous image 22.

As current image 23 includes movement, the value of each pixel is integrated in a direction of movement vector 24. Accordingly, in practice, current image 23 of FIG. 2 only shows approximately a gravitational center position of sides of each pattern.

Figure 3:
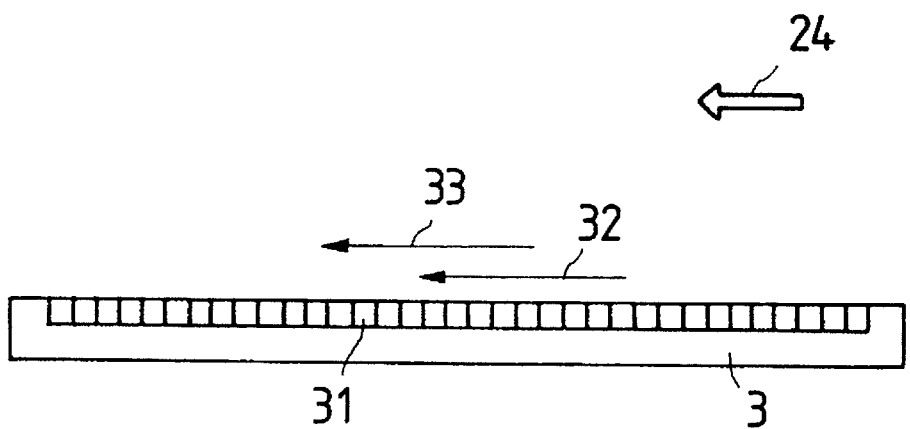
FIG. 3 is a view showing the movement of an optical image.

FIG. 3 is a front view showing the movement of the optical system. In the same figure, 31 is one cell when the pick-up element is a solid-state pick-up element such as a CCD. For the convenience of explanation, it is assumed that the movement direction of the image coincides with a direction of the array for one cell in the pick-up element 3. The pick-up element 3 converts a pattern of the optical image thereon during a predetermined period of exposure. 32 is an optical image at the start of exposure, and 33 is an optical image at the termination of exposure. The optical image 32 at the start of exposure is moved to the optical image 33 at the termination of exposure because the image moves during exposure as shown in FIG. 2.

The movement vector 24 as shown in FIG. 3 indicates the movement between the optical image 32 at the start of exposure and the optical image 33 at the termination of exposure. This is almost the same as that of FIG. 2, but more strictly, slightly different. That is, the movement vector as shown in FIG. 2 is one taken at nearly intermediate times of respective exposure periods for two images. On the contrary, the movement vector as shown in FIG. 3 is one taken for an image of interest from the start of exposure to the termination of exposure. Accordingly, when the amount of image movement changes abruptly, both movement vectors will have different values. Generally, both of the values can be almost the same, but the movement vector 24 as shown in FIG. 3 may be used after some slight correction when required in the parameter setting circuit 9, because the movement vector 24 obtained from the movement detection circuit 7 is one as shown in FIG. 2.

Figure 4A:
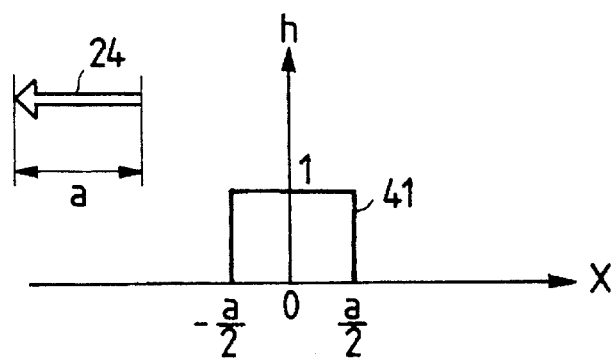
FIGS. 4A to 4C are characteristic views showing the filter characteristic for filtering.
Figure 4B:
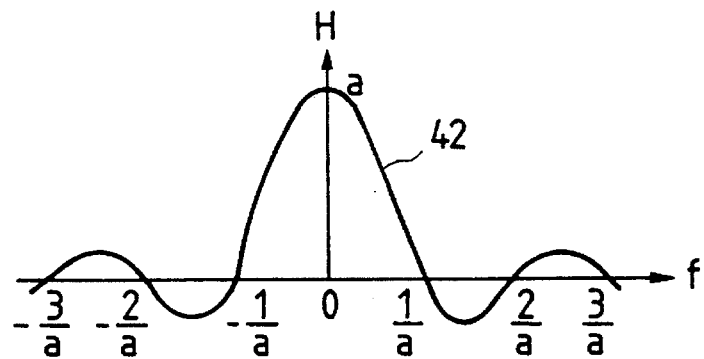
Figure 4C:
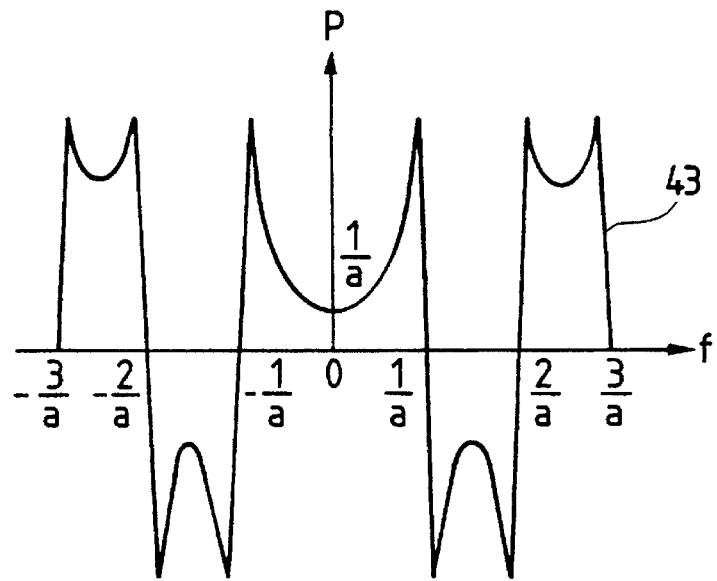

FIGS. 4A–4C are graphs showing the filter characteristics for the filtering in the filter 10 for correcting the degradation of the image.

In FIG. 4A, 41 is a point image distribution function with the movement of the image. The axis of abscissa x in the spatial coordinate system is taken along the movement direction. The length of the movement vector 24 is assumed to be a. Then, the image generated by one point of object 1 moves during the exposure period, approximately following the point image distribution function 41.

Representing that function as h(x)

$$h(x) = \text{Rect}(x/a) \quad (1)$$

42 in FIG. 4B is a frequency characteristic showing the degradation of the image.

Representing the frequency as f and the frequency characteristic 42 as H(f), $$H(f) = (\sin\pi af)/\pi f \quad (2)$$

because H(f) is a Fourier transform of the point image distribution function h(x).

43 in FIG. 4C is a frequency characteristic of the filter, and representing it as P(f), $$P(f) = 1/H(f) \quad (3)$$
$$= \pi f/(\sin\pi af)$$

Such a filter is called as an inverse filter.

That is, H(f)·P(f)=1, which means that the filtering of P(f) can compensate for the degradation of the image with H(f).

By filtering with filter 10, the resolution of output video signal 13 is enhanced and an excellent quality image can be obtained. However, the inverse filter can be realized only approximately because it has infinite value at the frequency where the Fourier transform H(f) is zero, and the frequency range can be a range where the frequency spectrum exists.

As clearly seen from FIGS. 4A–4C and expressions (2) and (3), the characteristic of degradation H(f) and the characteristic of compensation filter P(f) contain the size a of movement vector 24 as a parameter. The x-axis and f-axis are each taken along the direction of movement vector 24, which reveals that P(f) depends on the size and direction of movement vector 24.

Accordingly, it is desirable that the filter 10 has its filter characteristic changed adaptively depending on the movement vector 24.

The filter 10 has two methods of performing the filtering processing. One of them is filtering on the axis of frequency, in which the Fourier transform is taken of the image signal read out from the frame memory 6 with an FFT (Fast Fourier Transform), which is then multiplied by the inverse filter P(f), and the inverse Fourier transform is taken so that a filtered image signal is obtained.

Another filtering method is filtering on the axis of time, performed in such a way that the impulse response is obtained by the inverse Fourier transformation of inverse filter P(f), and convoluted to the image signal from the frame memory 6 so that a filtered output can be obtained.

When the inverse filter is realized with the convolution in the axis of time, an impulse response S(x) of the filter in the following expression can be used.

$$S(x) = K\delta'(x) * \left[ \sum_{K=-\infty}^{+\infty} \delta(x - (2k-1)a/2)\text{sign}(x) \right] \quad (4)$$

Where K is a proportional constant, δ(x) is a delta function, and δ'(x) is a derivative of the delta function. And "*" is a symbol indicating the convolution, and sign(x) indicates a sign such that $$\text{sign}(x) = \begin{pmatrix} 1 & X > 0 \\ 0 & X = 0 \\ -1 & X < 0 \end{pmatrix}$$

Note that the expression (4) is obtained by taking the Fourier transform of expression (3) using the delta function.

Figure 5:
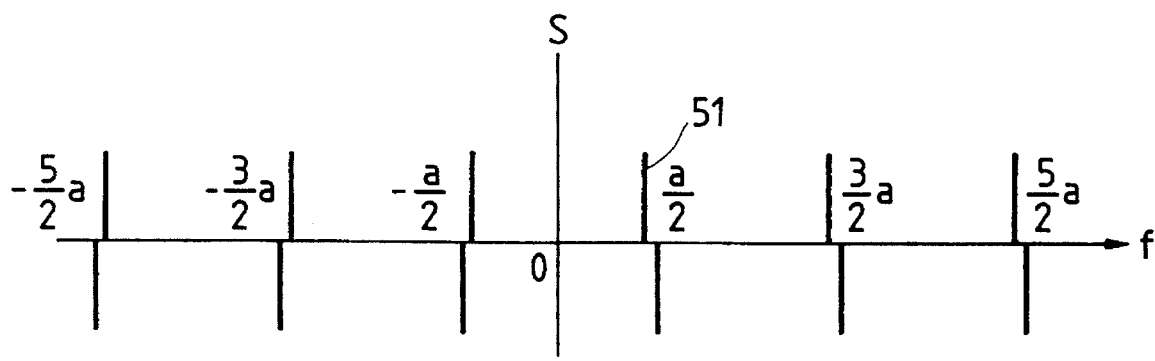
FIG. 5 is a characteristic view showing the inverse filter characteristic.

FIG. 5 is a graph showing the impulse response of an inverse filter.

51 is an impulse response of the inverse filter, representing the expression (4).

The expression (4) must be truncated midway because it continues infinitely in the direction of the x-axis. Therefore, it is desirable to use that function in the filtering processing after multiplication of the window function such as a hamming window.

In the inverse filter, the frequency area where the image information is almost lost with the degradation of the image, i.e., where the value of frequency characteristic 42 is zero, and the high frequency area where there is only a little image information by nature may be given the characteristic of a large gain so that the output image often has a poor S/N ratio. Therefore, in the filter 10, the Wiener filter can be substituted.

The frequency characteristic of the Wiener filter R(f) can be represented in the following expression.

$$R(f) = \frac{H(*)(f)}{|H(x)|^2 + \Phi_n(f)/\Phi_s(f)} \quad (5)$$

Where $\Phi_n(f)$ and $\Phi_s(f)$ indicate the power spectrum of noise and image signal, respectively, and $(*)$ indicates the complex conjugate.

Here, as it is difficult to obtain $\Phi_n(f)$ and $\Phi_s(f)$ correctly, $\Phi_n(f)$ is set to be constant by assuming white noise, and $\Phi_s(f)$ is set to be the Gaussian type. Or they can be predetermined with the assumption that $\Phi_n(f)/\Phi_s(f)$ is constant over all frequencies.

In the Wiener filter, at the frequency where the signal component is sufficiently larger than the noise component, the value is almost the same as that of the inverse filter, or conversely, it is close to zero at the frequency where the noise component is larger than the signal component.

Figure 6:
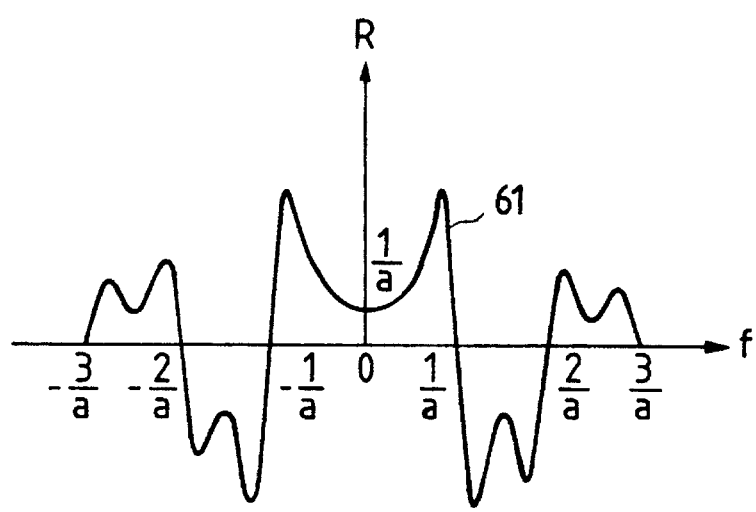
FIG. 6 is a characteristic view showing the Wiener filter characteristic.

FIG. 6 is a graph showing the frequency characteristic of a Wiener filter. 61 is a frequency characteristic of the Wiener filter. Compared with the frequency characteristic 43 of the inverse filter, it can be seen that the gain is smaller at the frequency area with the poor S/N ratio. And in the Wiener filter, like the inverse filter, it is desirable that the characteristic may be adaptively changed depending on the movement vector 24.

Various filter characteristics of the filter 10 have generally the characteristic of a high-pass filter or a band-pass filter.

Figure 7:
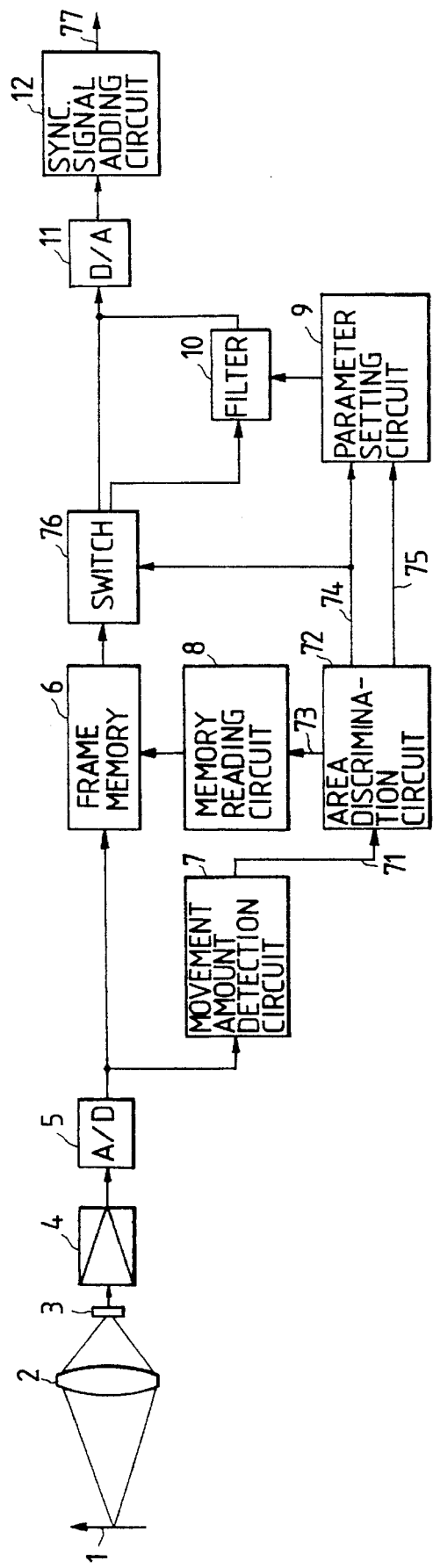
FIG. 7 is a block diagram showing a second example of the present invention.

FIG. 7 is a block diagram showing a second embodiment of the present invention.

The second embodiment shows a device which is effective when there are a moving area and a stationary area in an image, and further when the moving area is separated into a plurality of regions which have different movement vectors.

71 is an output of the movement amount detection circuit 7, i.e., the movement vector for each block or pixel within a screen. 72 is an area discrimination circuit, 73 is its output, i.e., an address offset signal, 74 and 75 are other outputs of the area discrimination circuit 72, i.e., the area signal and movement vector within the area, respectively. 76 is a switch for sending the input signal to either of two output lines. 77 is an output video signal being processed for each area.

The stages where the input image signal is converted from analog to digital form, stored into the frame memory 6, and transferred to the movement amount detection circuit 7 are the same as in the first embodiment.

The movement amount detection circuit 7 transfers the movement vector 71 to the area discrimination circuit 72.

The area discrimination circuit 72 divides the screen into the stationary area and a plurality of moving areas having different movement vectors, based on the movement vector 71. The area discrimination circuit 72 selects a desired area of divided areas, and sends the movement vector of the selected area as an address offset signal 73 to the memory reading circuit 8. The memory reading circuit 8 reads the image signal from the frame memory 6 by offsetting the address, based on the received signal. Thereby, the entire screen is shifted.

The area discrimination circuit 72 sends the area signal 74 and the movement vector 75 within the area to the parameter setting circuit 9, and the parameter setting circuit 9 sets a different filter characteristic for each area to the filter 10. The area signal 74 is also sent to the switch 76, which sends the image signal from the frame memory 76 to the D/A converter 11 for the stationary area or to the filter 10 for the moving area. The output of filter 10 is subsequently sent to the D/A converter 11. That is, only for the moving area is the filtering processing performed.

Note that the switch 76 can be integrated into the filter 10 by using a filter which allows the transmission of a whole frequency band, if the stationary area is considered as a special case in the filter 10.

The analog signal output of the D/A converter 11 has a synchronism signal added by the synchronism signal adding circuit 12, and is sent out as the output video signal 77 being processed for each area.

Figure 8:
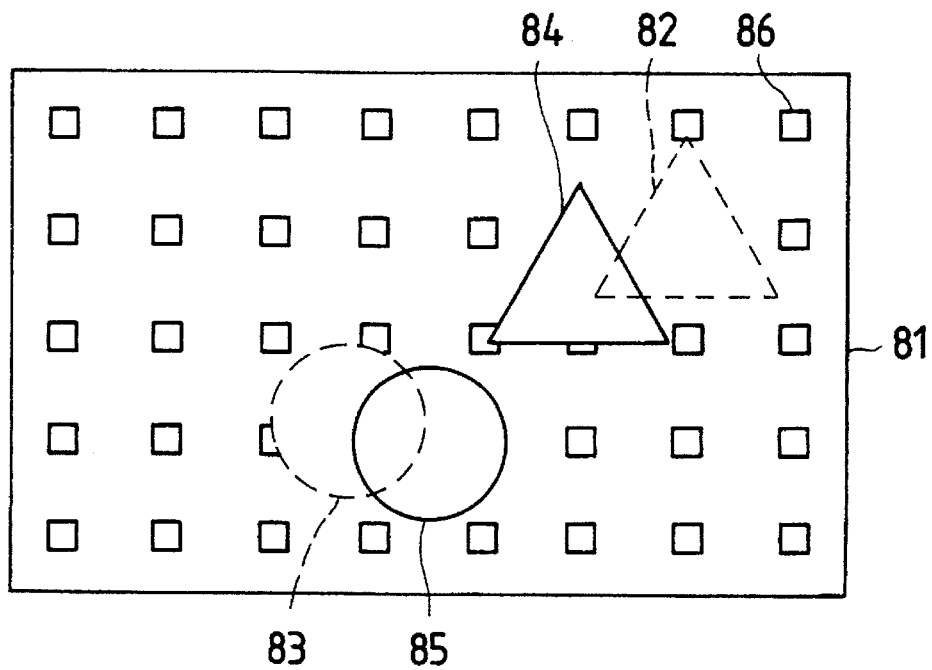
FIG. 8 is a view showing images containing a plurality of movements.

FIG. 8 is a plan view showing images containing a plurality of movements. In this figure, 81 is an output screen which corresponds to a monitor display screen.

82 and 83 are first and second images of a previous screen, respectively. 84 and 85 are first and second images of a current screen, respectively. 86 is a background image composed of small squares arranged in FIG. 8.

In transferring from the previous screen to the current screen, the first and second images 82, 83 of the previous screen are moved to the first and second images 84, 85 of the current screen on the output screen 81, respectively. However, the moving directions and sizes of the two images are different. The background image 86 is not moved herein, i.e., coincident between the previous screen and the current screen.

Figure 9:
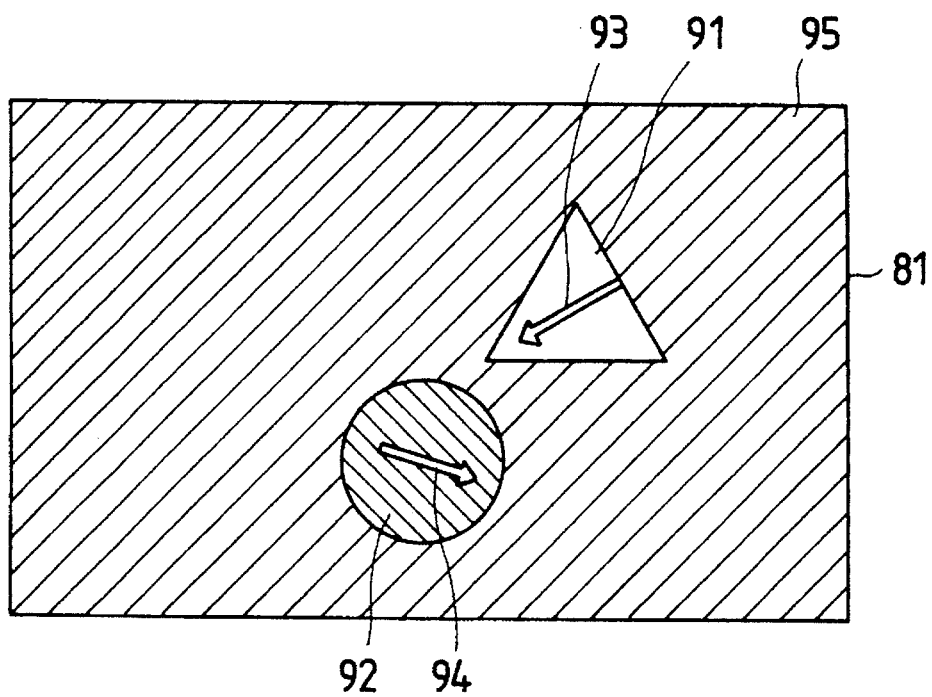
FIG. 9 is a view showing area decision results.

FIG. 9 is a plan view showing the area discrimination result.

91 and 92 are first and second moving areas, respectively. 93 and 94 are the movement vectors within areas of the moving areas 91, 92. 95 is a stationary area.

The area discrimination circuit 72 of FIG. 7 performs the area division and the calculation of the movement vector within the area as shown in FIG. 9. That is, the first and second moving areas 91, 92 and the stationary area 95 are divided, and the movement vectors 93, 94 within the areas are obtained for the first and second moving areas 91, 92.

When the device as shown in FIG. 7 is a tracking device, the tracking of a specified image is performed. If it is assumed that the second image 83 is tracked in the current screen, the area discrimination circuit 72 sends the movement vector 94 within the area of the second moving area 92 to the memory reading circuit as an address offset signal 73. At this time, as a result of shifting of the image due to the offset applied in reading the image signal from the frame memory 6, the second image 84 of the current screen is displayed at the same place as the first image 83 of the previous screen on the output screen 81. The images of other areas are shifted.

The switch 76 sends the image signal of the first and second moving areas 91, 92 to the filter 10, and that of the stationary area 95 directly to the D/A converter.

The filter 10 has its filter set with a different characteristic by the parameter setting circuit 9, depending on the movement vectors 93, 94 within the areas, for the images of the first and second moving areas 91, 92, in order to perform the filtering processing. The settings of the filter and parameters used in the filter 10 are the same as in the first embodiment.

As described above, the movement detection device of the present invention can compensate for the degradation of image quality resulting from the movement of the image with filtering processing, so that there is an effect of increasing the resolution of the output image with the movement correction device, thereby providing a high quality image.

Further, the filtering characteristic useful for the filtering processing has such an effect that the image quality is made excellent, nearly optimal, by changing it adaptively based on the movement vector to be obtained especially for the movement correction, and without increasing the cost.

Next, to accomplish the sixth and seventh objects of the present invention, an embodiment in which the movement detection device is applied to a focus detection apparatus to improve the focus detection accuracy will be described.

Recently, image equipment such as a video camera or an electronic camera have been remarkably developed, and it is a requisite for its function to have an automatic focus adjustment device.

By the way, for the focus detection device, there are provided a device of the passive type in which the focusing signal is obtained by taking the correlation of the image picked up by a twin-lens optical system, or an automatic focus adjustment device of the active type in which the focusing is judged from a position of a spot generated by reflected light flux by radiating an infrared light onto an object.

On the other hand, in the pick-up device such as a television camera, a focus detection device has been developed in which the focus detection is performed by carrying out the image processing of the image signal. In such a device using image processing, the signal for detecting the focusing state is obtained from the image signal, whereby there is a feature that the focus detection is allowed irrespective of the distance from an object, without special elements or a circuit for providing the infrared projection, and with high precision, so that its development has rapidly progressed.

Figure 16A:
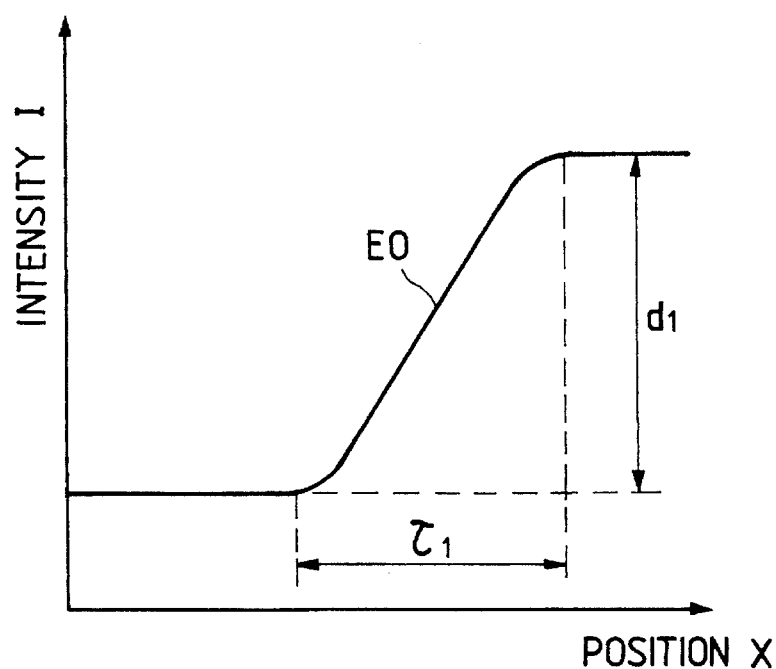
FIGS. 16A and 16B are schematic graphs showing a focus detection method using a conventional image processing.
Figure 16B:
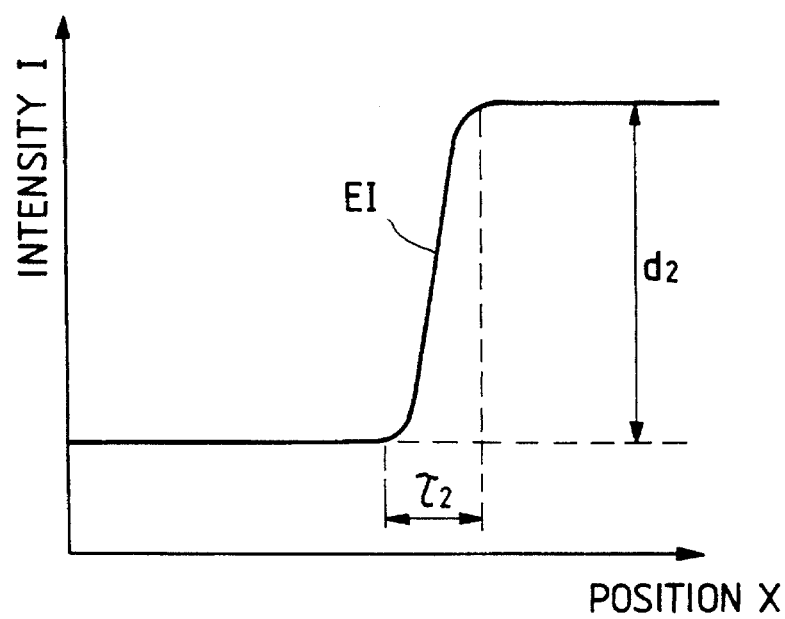

FIGS. 16A–16B are views for explaining an embodiment of a focus detection method with conventional image processing, illustrating the intensity distribution for the edge portion of an object image in the unfocused and focused states, in which FIG. 16A shows the unfocused state and FIG. 16B shows the focused state.

In FIG. 16A, EO shows an intensity distribution of the edge portion for an object image in the unfocused state, with a vague distribution due to the unfocused condition and a large width of the edge portion.

Also, in FIG. 16B, EI shows an intensity distribution of the edge portion for an object image in the focused state and at the same place as for the intensity distribution EO of an unfocused edge portion. In the focused state, it shows a narrow and steeply rising-up edge.

Accordingly, the width of the edge portion for the object image is detected, and focusing and unfocusing are judged from this edge width. That is, focusing can be judged by making use of the property of a narrow edge width.

The edge intensity distribution EO in the unfocused state is a distribution of the edge portion detected from the image signal, where the edge width is represented by the following expression.

$$l_1 = d_1 / (dI_1(x)/dx) \quad (6)$$

Where $d_1$ indicates an intensity difference of the edge portion. $I_1(x)$ is a function for representing the intensity distribution of the edge in the unfocused state, whereby $Di_1(x)/dx$ indicates a slope of the edge. This slope of the edge can be used by taking the average of the slopes of focusing in a range from a portion where the edge rises up to a portion where it becomes flat again.

Also, when focused, the width of edge $l_2$ can be calculated from the intensity distribution EI for the focused state, using the following expression.

$$l_2 = d_2 / (Di_2(x)/dx) \quad (7)$$

Where $d_2$ is an intensity difference of the edge portion, $I_2(x)$ is a function for representing the intensity distribution EI of the edge in the focused state, and $Di_2(x)/dx$ is a slope of the edge. $d_2$ has almost the same value as $d_1$, and $Di_2(x)/dx$ is larger than $Di_1(x)/dx$.

Accordingly, since $l_2$ is a smaller value than $l_1$, it can be seen that the edge width becomes smaller and the focusing has been adjusted.

In this way, generally, a method (in which the edge width is calculated from a density difference and a slope of the edge portion, and the state is judged nearer to the focused state if the value is smaller) is practiced as one method of performing focus detection with image processing.

However, in the above-mentioned focus detection method, when an image has movement, i.e., when an object is moving, or when the whole screen has shifted as a result of trembling of the hand and/or panning, the image becomes unfocused due to the movement, whereby there is a disadvantage that the width of the edge is widened due to the movement, and correct detection of the focus state can not be made.

The following embodiment has been made to resolve the above-mentioned problems, and is characterized by focus detection apparatus comprising movement detection means for detecting a movement of an image from the image pick-up signal, movement correction means for correcting the movement of the image based on the output of the detection means, and focus detection means for performing the focus detection by extracting a signal component which varies with the focusing state from the pick-up signal having its movement component corrected by the movement correction means.

Thereby, a high precision focus detection apparatus can be realized without decreasing its precision owing to the movement of the image, in which the focus detection can be performed by detecting the movement of an image from an image signal, and using the signal for which the degradation of resolution due to the movement of the image is compensated.

A focus detection apparatus of this example will be described in detail below with reference to the drawings.

Figure 10:
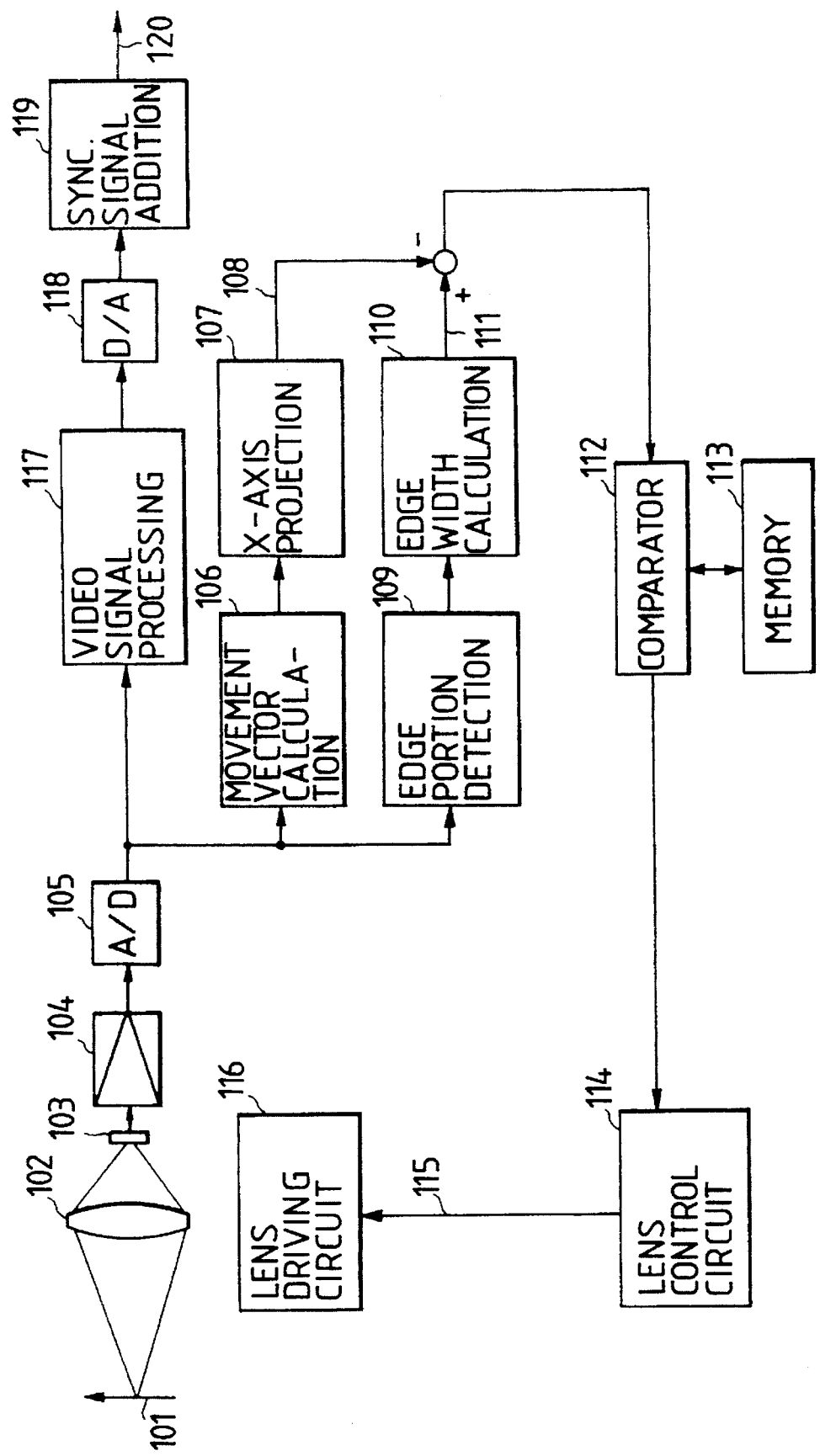
FIG. 10 is a block diagram showing a third example of a movement correction device according to the present invention.

FIG. 10 is a block diagram showing a third example in which a movement detection device of the present invention is applied to the focus detection apparatus. In the same figure, 101 is an object, 102 is a pick-up lens, and 103 is a pick-up element (or pick-up tube) such as a CCD for outputting a pick-up signal by photoelectrically converting an object image formed on a pick-up plane by the pick-up lens 2. 104 is an amplifier for amplifying the pick-up signal output from the pick-up element 3 to a predetermined level, 105 is an A/D converter for converting an input analog pick-up signal to the digital signal, 106 is a movement vector operation circuit for obtaining the movement vector of the image from the image signal which has been converted to the digital signal by the A/D converter 105, 107 is an x-axis projection circuit for projecting the movement vector on the x-axis that is a horizontal direction of the screen, and 108 is an x component of the movement vector.

109 is an edge detection circuit for detecting the width of the edge portion for an object image, 110 is an edge width detection circuit for detecting the width of the edge portion detected by the edge detection circuit 109, and 111 is an edge width signal.

112 is a comparator, and 113 is a memory. 114 is a lens control circuit, 115 is a lens control signal, and 116 is a lens driving circuit for moving the pick-up lens 102 in a direction of the optical axis to adjust the focus.

On the other hand, 117 is a video signal processing circuit for outputting a standard television signal by performing signal processing such as gamma correction or various filtering of the pick-up signal output from the A/D converter 105, 118 is a D/A converter for converting the digital signal output by the video signal processing circuit 117 to an analog signal, and 119 is a synchronism signal adding circuit for adding a synchronism signal to the image signal output from the D/A converter 118, and 120 is an output video signal.

With the above constitution, the pick-up lens 102 forms an image of object 101 on the pick-up plane of pick-up element 103, and the pick-up element 103 converts photoelectrically the image of the object to output an image signal. The image formed on the pick-up element 103 includes movement owing to the movement of the pick-up lens 102, pick-up element 103, or object 101.

The image signal output from the pick-up element 103 is amplified by the amplifier 104, and converted to a digital signal by the A/D converter 105.

A part of the digitized image signal is input into the movement vector operation circuit 106. The movement vector operation circuit 106 contains a frame memory where the image of a previous frame is stored, and in which the movement vector of the image is calculated by comparing the image of the current frame with that of the previous frame stored in the frame memory. Exemplary of the method of calculating the movement vector is that used in a so-called representative point matching method, or a gradient method can be used.

The x-axis projection circuit 107 gives an x-axis component signal 108 from the movement vector obtained by the movement vector operation circuit 106.

The digitized image signal is sent to an edge portion detection circuit 109. The edge portion detection circuit 109 detects an edge portion from the information such as a slope for the image signal, and selects an edge having the largest slope with respect to the x-axis, for example, as the edge for judgement of the focusing. The edge width operation circuit 110 calculates the width of the edge from a density difference of the edge and a slope of the edge, as above-described, and outputs it as an edge width signal 111. The edge width signal 111 is subtracted from the x-axis component signal 108 of the movement vector and then sent to the comparator 112. The signal sent to the comparator 112 is an edge width signal with the movement of the image corrected. And the comparator 112 compares the input corrected edge width signal with data within the memory 113.

Within the memory 113, the corrected edge width signal in the previous field or frame is stored.

The comparator 112 sends a control signal to the lens control circuit, as well as writing a smaller edge width signal of two corrected edge width signals into the memory 113.

The control signal is one in which driving of the current pick-up lens 102 is continued in the same direction when a newly input edge width signal is smaller than the previous edge width signal, or driving is performed in a reverse direction when it is larger than the previous edge width signal. Also, it may be permitted to send a signal in which the amount of driving the lens is gradually changed depending on the amount of variation in the corrected edge signal. Or when the amount of variation is quite small, a control signal for stopping the driving of the lens can be sent by deciding on the focusing state if the amount of variation is changed from negative to positive. In order to make the fine control, it is desirable that corrected edge signals (as much as several frames) should be stored in the memory 113.

The lens control circuit 14 issues a lens driving signal 115, based on a control signal sent from the comparator 112, in accordance with which the lens driving circuit 116 drives the pick-up lens 102.

On the other hand, the digitized image signal is input into the video signal processing circuit 117, is then input into the D/A converter 118 for conversion into the analog signal, has a synchronism signal added in the synchronism signal adding circuit 119, and is output as a video signal.

Figure 11:
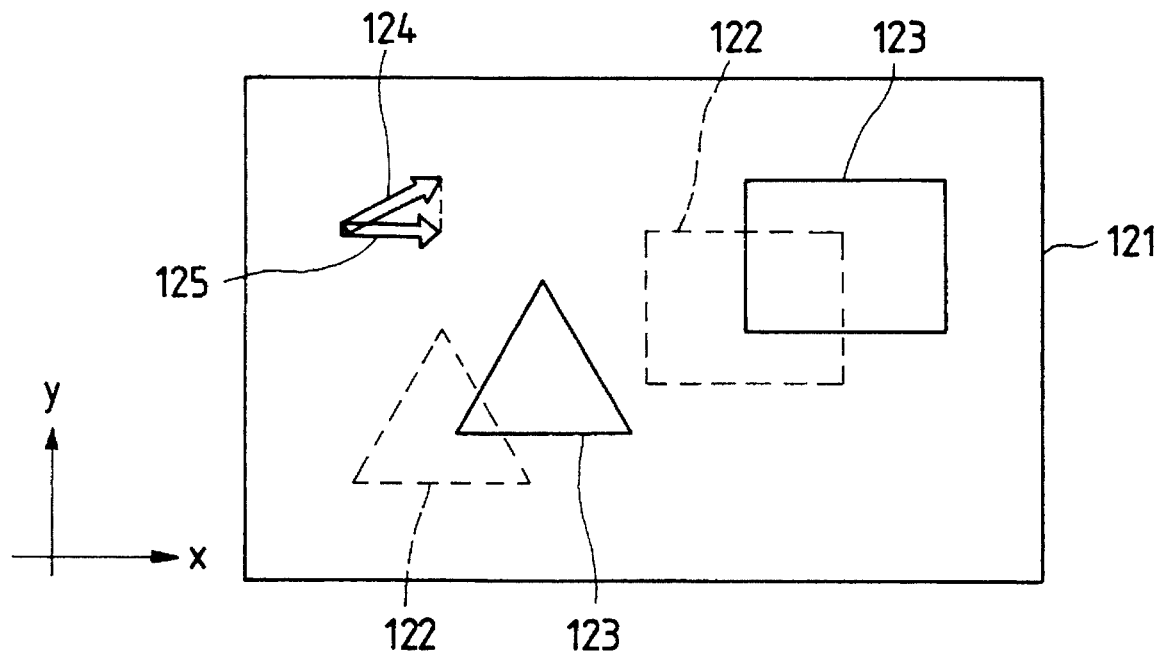
FIG. 11 is a view showing the movement of the image.

FIG. 11 is a view showing schematically the movement of the image, like in FIG. 2. In this figure, 121 is an output screen. For example, a monitor display screen can be assumed. Like in FIG. 2, 112 is a previous image, and 123 is a current image. 124 is a movement vector when the previous image 122 moves to the current image 123. 125 is a projection vector of the movement vector 124 onto the x-axis.

In the output screen 121, a video signal 120 of FIG. 10 is displayed.

For example, an image displayed with trembling of the hand or panning shows that movement from previous image 122 to current image 123 when time has passed from one clock to another even if the object 101 is a stationary object.

Accordingly, the movement vector 124 is calculated in the movement vector operation circuit 106, and the projection vector 125 is calculated in the x-axis projection circuit and output as an x-axis signal component 108.

Here, as the current image 123 includes movement, the value of each pixel is integrated in the direction of movement vector 124. Accordingly, in practice, current image 123 as shown in FIG. 11 only shows approximately a gravitational center position of the sides of each pattern.

Figure 12:
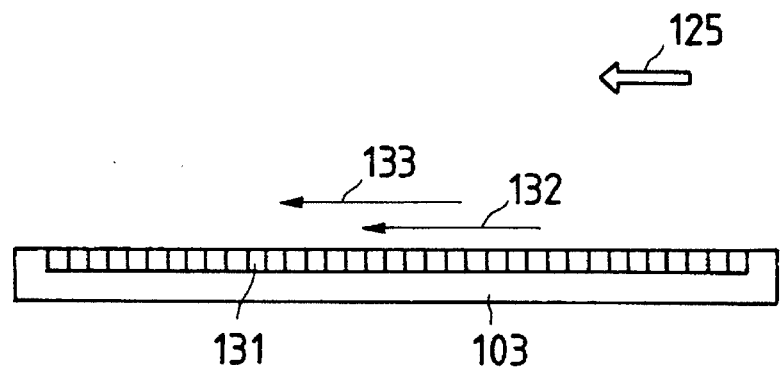
FIG. 12 is a view showing the movement of an optical system.

FIG. 12 is a front view showing the movement of the optical system. In the same figure, 131 is one cell when the pick-up element is a solid-state pick-up element such as a CCD.

For the convenience of explanation, it is assumed that the movement direction of the image coincides with the array direction of one cell in the pick-up element 103. The pick-up element 103 converts a pattern of the optical image thereon during a predetermined period of exposure. 132 is an optical image at the start of exposure, and 133 is an optical image at the termination of exposure. The optical image 132 at the start of exposure has been moved to the optical image 133 at the termination of exposure because the image moves during exposure like in FIG. 11. The movement vector 124 as shown in FIG. 12 indicates the movement between the optical image 132 at the start of exposure and the optical image 133 at the termination of exposure. This is almost the same as in FIG. 11, but more strictly, slightly different. That is, the movement vector as shown in FIG. 11 is one taken at nearly intermediate times of respective exposure periods for two images. On the contrary, the movement vector as shown in FIG. 12 is one taken for an image of interest from the start of exposure to the termination of exposure.

Accordingly, when the amount of image movement changes abruptly, both the movement vectors may have different values. Generally, both values can be almost the same, but the movement vector 24 can be used after slight correction, because the movement vector 124 obtained from the movement vector operation circuit 106 is as shown in FIG. 11.

Figure 13:
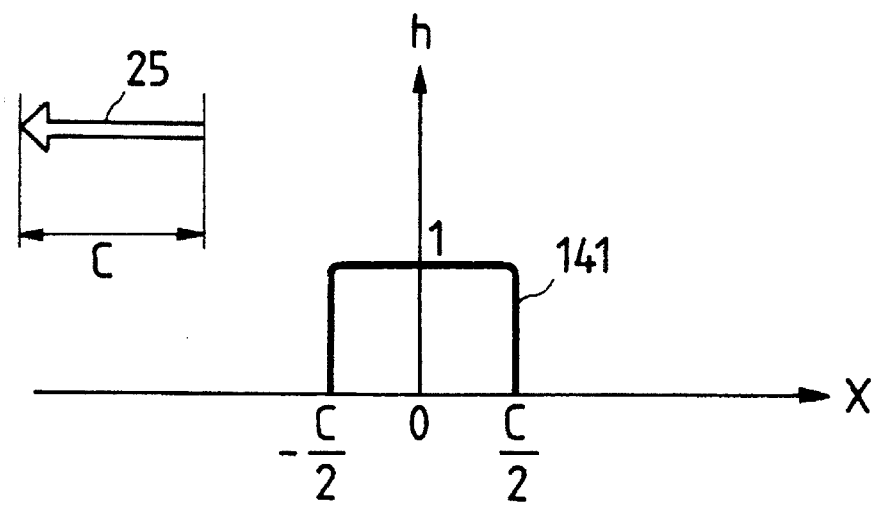
FIG. 13 is a view showing a point image distribution function with the movement of the image.

FIG. 13 is a characteristic graph showing a point image distribution function with the movement of the image. The form of the function is the same as the example of FIG. 4. 141 is a point image distribution function. Here, it is assumed that the length of projection vector 125 is c. Then, the line generated by one point of object 102 moves during the exposure period, approximately following the point image distribution function 141. Representing that function as h(x) which can be represented as previously shown in the expression (1), $$h(x) = \text{Rect}(x/c) \tag{8}$$

The pick-up image becomes unfocused in accordance with the expression (1), due to its movement as well as the out-of-focus state.

Figure 14:
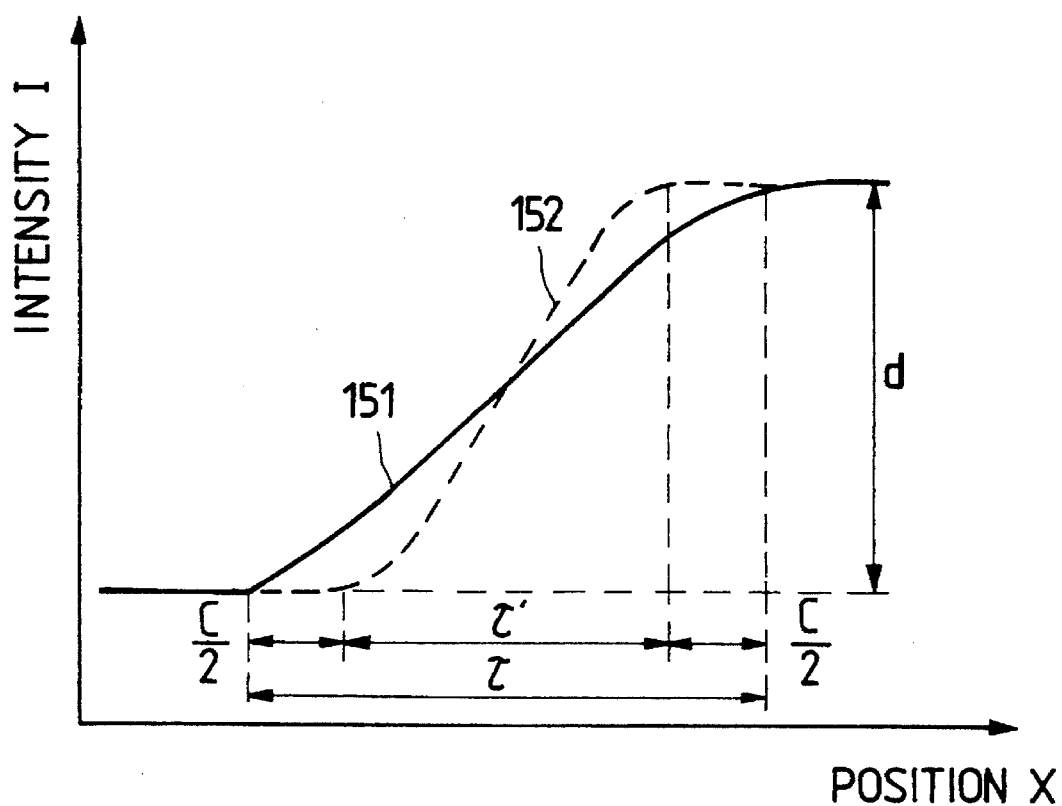
FIG. 14 is a view showing the correction of an edge width.

FIG. 14 is a characteristic graph showing the correction of the edge width.

151 is an image signal of the edge portion, with its intensity distribution being I(x). This corresponds to a signal directly obtained from the pick-up element 103. 152 is an intensity distribution of the edge portion when the image does not contain any movement, its intensity distribution being I'(x). The dullness of the edge for I'(x) can be determined by the shape of an original object and the amount of out-of-focus.

The image signal 151 for the edge portion is an image signal of the portion selected in the edge portion detection circuit 109. The edge width operation circuit 110 calculates the width of edge 1 from a density difference of edge d and a slope dI(x)/dx, such that $$l = d/(dI(x)/dx) \tag{9}$$

However, l contains the amount of unfocus due to the movement of the image.

Between I(x) and I'(x), the following relation stands.

$$I(x) = I'(x) * h(x) \tag{10}$$

Here, * represents the convolution operation.

h(x) is a function of width c as shown in FIG. 13, in which I(x) has an edge slope portion widened by about c/2 to the right and left, compared with I'(x), as shown in FIG. 14. Accordingly, assuming the width of the edge for I'(x) as l', the following expression approximately stands.

$$l = l' + c \tag{11}$$

The width of edge l directly obtained from the image signal 151 of the edge portion contains the size c of projection vector 125, thus having a larger value than originally obtained, and may vary in accordance with the movement of the image. In the expression (11), by subtracting c from l, it is clear that l' can be obtained, and is not subject to the influence of the movement of the image by judging the focusing based on l'.

That is, as shown in FIG. 10, by subtracting an x-axis signal component 108 having the value of c from an edge width signal 111 having the value of l, l' is obtained, and then input into the comparator for use as a signal for judging the focusing, so that the detection of focusing can be made without influence of the movement of the image.

In the explanation given herein, by considering that the intensity distribution of the edge portion is obtained along the x-axis, the movement vector is also projected onto the x-axis. As the movement vector 24 is obtained in the form of a representation with x-axis and y-axis components, the processing for the x-axis projection is practically unnecessary. But if the intensity distribution of the edge portion is obtained in a horizontal axis, i.e., other than x-axis, for example, in the steepest direction of the edge portion of interest, so as to calculate the width of the edge, the projection of the movement vector is necessary. The size of the projection vector can be obtained in a simple manner as a value of the inner product between a unit vector in its direction and the movement vector.

Figure 15:
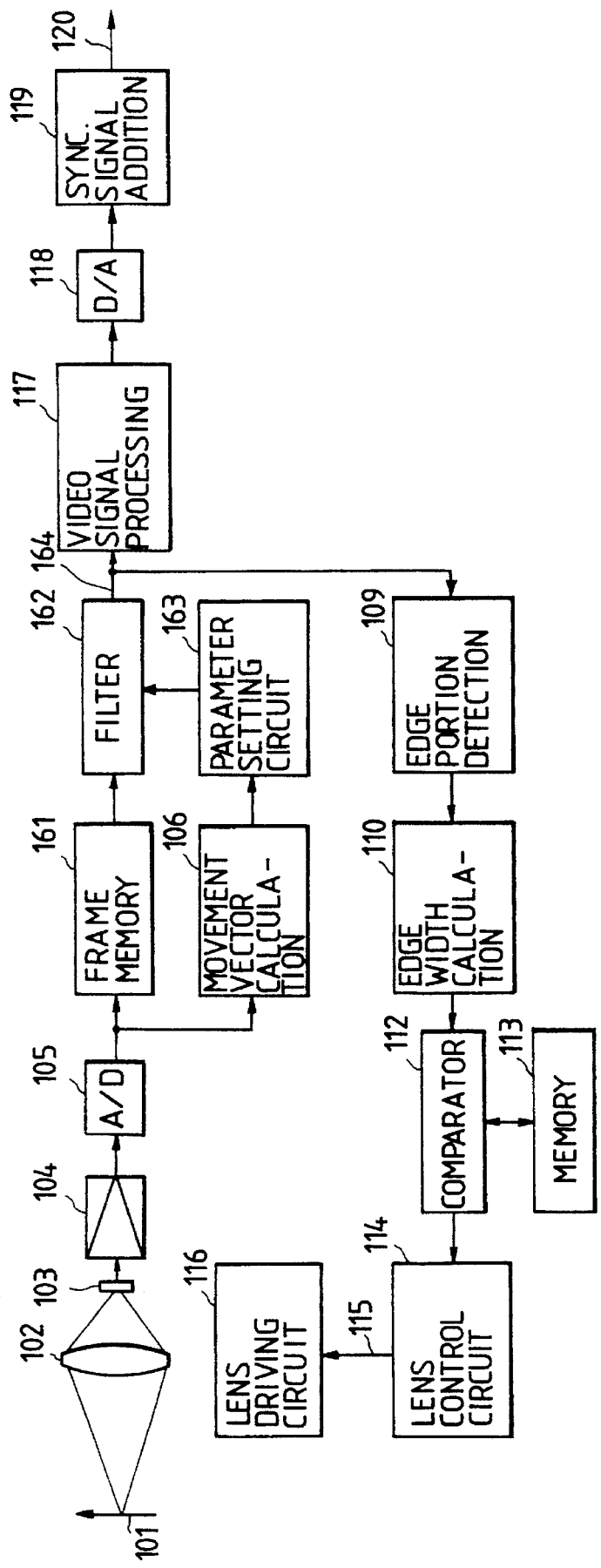
FIG. 15 is a block diagram showing a fourth example of the present invention.

FIG. 15 is a block diagram showing a fourth example of focus detection apparatus according to the present invention. In the same figure, 161 is a frame memory, and 162 is a filter. 163 is parameter setting circuit for supplying parameters to the filter 162. 164 is a filtered image signal.

In this example, the signal read from the pick-up element 103 is passed to the filtering processing based on the movement vector, to perform the focus detection from that signal.

Like in the third embodiment, the digitized image signal is output from the A/D converter 105. The frame memory 161 stores this signal temporarily.

The digitized image signal is also sent to the movement vector operation circuit 106, where the movement vector 124 is calculated. The frame memory 161 acts as a delay element for synchronizing the image signal to terminate the calculation of movement vector 124.

The signal read from the frame memory 161 is sent to the filter 162, where the filtering processing is performed. The frequency characteristic of filter 162 is set by the parameter setting circuit 163, where the parameters are given to the filter 162 so as to correct the unfocused image from the calculation result of movement vector 124.

The filtered image signal 164 is sent to the edge portion detection circuit 109, where like in the first embodiment, the edge portion is selected, and after that operation, the focusing judgment operation is performed to drive the pick-up lens 102.

On the other hand, the filtered image signal 164 is sent to the video signal processing circuit 117, where like in the third embodiment, it is finally output as an output video signal 120.

The principle of this example will be described below.

Let the size of movement vector 124 be a', and let the spatial coordinate along the movement direction be x'. The point image distribution function h'(x) generated by the movement vector 24 is given by, in accordance with the previous expression (1), $$h'(x) = \text{Rect}(x'/a) \tag{12}$$

The degradation of the image can be corrected by filtering.

The filter for the filtering can use the characteristic as shown in FIGS. 4B and 4C in the first example. Explaining this using FIGS. 4B and 4C, 42 is a frequency characteristic showing the degradation of the image with movement, and can be represented by the previous expression (2).

Accordingly, the frequency characteristic of the inverse filter for compensating for the degradation of the image as described above is as shown by 43 in FIG. 4C. That is, H(f)·P(F)=1, in which the filtering with P(f) allows the compensation for the degradation of the image with H(f).

By filtering with that filter in the filter 162 in FIG. 15, the resolution of output video signal 120 is increased, so that an excellent image can be obtained. However, in this embodiment, the inverse filter can be achieved only approximately, because it becomes infinite at the frequency where H(f) is zero. The range of the frequency can be a range where the frequency spectrum for the image signal exists.

As clearly seen from FIGS. 4A and 4C, expressions (2) and (3), the characteristic of degradation H(f) and the characteristic of compensation filter P(f) contain the size a of movement vector 24 as a parameter. The x'-axis and f-axis are taken along the direction of movement vector 124, respectively, and P(f) depends on the size and direction of movement vector 124.

Accordingly, it is desirable that the filter 162 changes adaptively in accordance with the movement vector 124.

In order to perform the filtering processing in the filter 162, there are two methods like in the previous first embodiment. One of them is the filtering on the axis of frequency, in which the Fourier transform is taken of the image signal read out from the frame memory 161 with an FFT (Fast Fourier Transform), which is then multiplied by the inverse filter P(f), and the inverse Fourier transform is taken, so that the filtered image signal is obtained.

Another method is the filtering on the axis of time, performed in such a way that the impulse response is obtained by the inverse Fourier transform of the inverse filter P(f), and convoluted to an image signal from the frame memory 6 so that a filtered output can be obtained.

As regards the constitution of the filter and the filtering processing used herein, the inverse filter and the Wiener filter can be used, as described using expressions (10), (11) and FIGS. 5, 6 in the previous first embodiment, and the explanation of the analysis is omitted. With the filtering, the degradation of the image, i.e., the degradation of resolution, can be compensated, so that an excellent focus detection can be made.

Also, in the filter 162, other various filters may be used. As the frequency characteristic 43 has a characteristic of a low-pass filter, the filter characteristic of filter 162 has generally a characteristic of a high-pass filter or a band-pass filter.

The edge portion of the edge signal in the filtered image signal 164 is represented as a signal analogous to that as shown in FIG. 14. That is, before filtering, it is like the edge portion of image signal 151, but after filtering, it becomes the intensity distribution 152 when there is no movement of the image.

Accordingly, by calculating an edge signal width from the filtered image signal 164 and using it for judgment of the focusing, a stable detection of the focus can be performed without almost any influence of image movement. Also in the case, the value of the edge width obtained is smaller than if the edge width is calculated without taking into consideration the movement of the image.

Also, in this embodiment, there is a feature that the output video signal 120 itself can provide an excellent and high-quality image with high resolution.

When the whole screen does not move and an object is moving, by dividing the area, portions having common movements can be subjected to the processing based on the same movement vector.

It is noted that for the detection of image movement, the method of processing the image signal was described, but when the service condition of the pick-up device is subject to much vibration, and provided with a vibration-proofing apparatus, the movement vector signal can be obtained from an angular sensor or acceleration sensor of a vibration-proof apparatus. In this case, it is not simple to deal with the movement of the object, but when the movement of the whole screen is predominant due to the vibration, a desired movement vector can be obtained and excellent focus detection can be made.

As above described, with the focus detection apparatus according to the present invention, focus detection can be performed by detecting a signal component varying with the focusing state from the pick-up signal, wherein movement correction means is provided for detecting and correcting the movement of the image. The focus detection is made based on a signal component having the movement corrected by said movement detection means, so that it is possible to prevent the degradation of accuracy in the focus detection means caused by the decrease of signal depending on the focusing state, such as the dullness at the edge portion or the decrease of the high frequency component due to the movement of image. Thus, a stable focus detection apparatus with high precision can be provided at all times and it is not subject to the influence of camera vibration or the movement of the object.

We claim:

1. A movement detection device for detecting movement of an image incident on an image sensing device, and for compensating for the movement of the image, comprising:

(A) movement detection means for detecting the movement of the image from image signals output from the image sensing device;

(B) correction means for performing an electrical movement correction on the image signals output from said image sensing device according to the movement detected by said movement detection means; and (C) filter means for receiving the movement-corrected image signals output from said correction means, and for filtering the movement-corrected image signals to compensate for degradation of image resolution due to the movement of said image.

2. A movement detecting device according to claim 1, wherein a filter characteristic of said filter means is adaptively determined in accordance with the movement of said image.

3. A movement detection device according to claim 2, wherein said filter means comprises an inverse filter having a frequency characteristic for correcting a frequency characteristic of the movement of image.

4. A movement detection device according to claim 2, wherein said filter means comprises a Wiener filter.

5. A movement detection device according to claim 2, wherein said movement detection means detects a movement vector of the image from the image signals output from the image sensing device.

6. A movement detection device according to claim 5, wherein said movement detection means changes the filter characteristic adaptively in accordance with the detected movement vector.

7. A movement detection device according to claim 1, further comprising movement correction means for correcting the movement of the image based on the output of said movement detection means.

8. A movement detection device according to claim 7, further comprising an image memory for storing the image signals, and wherein said movement correction means corrects the movement of the image by changing an address for reading the image signals from said image memory based on the amount and direction of detected image movement.

9. A movement detection device according to claim 8, wherein said filter means is coupled to an output side of said image memory.

10. A movement detection device comprising:
   (A) image pick-up means for picking up an image and outputting image pick-up signals corresponding thereto;
   (B) an image memory for storing the picked-up image signals;
   (C) movement vector detection means for detecting a movement vector of the image using said image pick-up signals;
   (D) image movement correction means for offsetting the movement of the image by changing a read address for reading the picked-up image signals from said image memory in accordance with said movement vector;
   (E) filter means for filtering said image pick-up signals read out from said image memory by said image movement correction means; and
   (F) correction means for correcting a degradation of image resolution caused by movement of said image by changing a frequency characteristic of said filter means, based on the movement vector output by said movement vector detection means.

11. A movement detection device according to claim 10, wherein said filter means has a frequency characteristic for compensating for the frequency characteristic of the image movement.

12. A movement detection device according to claim 11, wherein said filter means comprises an inverse filter of inverse polarity to the frequency characteristic of said image movement.

13. A movement detection device according to claim 11, wherein said filter means comprises a Wiener filter.

14. A movement detection device for detecting movement in an image from image signals output from an image sensing device, said movement detecting device comprising:
   (A) movement detection means for detecting movement of an image within an image screen from the image signals output by said image sensing device;
   (B) movement correction means for correcting the movement of the image by correcting the image signals output from said image sensing device based on an output of said movement detection means;
   (C) filter means for performing a filter processing operation on the corrected image signals output from said movement correction means to compensate for the degradation of image signal resolution due to the movement of said image, based on the output of said movement detection means; and
   (D) filter control means for adaptively controlling an operation of said filter means on the basis of the output of said movement detection means when said movement detection means detects at least one of a moving area and a stationary area in said image screen.

15. A movement detection device according to claim 14, wherein said filter control means controls said filter means to perform filter processing on the image signals in the moving area within the image screen, when said movement detection means detects said moving area.

16. A movement detection device according to claim 15, wherein a filter characteristic of said filter means is adaptively changed by said filter control means in accordance with the movement of said image.

17. A movement detection device according to claim 14, wherein said filter means comprises an inverse filter having a frequency characteristic for correcting a frequency characteristic of the movement of the image.

18. A movement detection device according to claim 14, wherein said filter means comprises a Wiener filter.

19. An image processing device for detecting movement of an image from a received image signal, and for compensating for the movement of the image, comprising:
   (A) image signal receiving means for receiving the image signal;
   (B) movement detection means for detecting the movement of the image from the image signals received by said image receiving means;
   (C) compensating means for performing an electrical movement compensation on the image signals output by said image signal receiving means according to the movement detected by said movement detection means; and
   (D) filter means for receiving the movement-compensated signals output from said compensating means, and for filtering the movement-compensated image signals to improve an image quality of the movement compensated signals.

20. A device according to claim 19, wherein said filter means comprises an inverse filter having a frequency characteristic for compensating a frequency characteristic of the movement of the image.

21. A device according to claim 19, wherein said filter means comprises a Wiener filter having a filter characteristic for compensating a frequency characteristic of the movement of the image.

22. A device according to claim 19, wherein said movement detection means detects movement vectors of the images from the image signals received by said receiving means.

23. A device according to claim 22, wherein said compensating means comprises:
   an image memory for storing the image signal received by said receiving means;
   a memory control circuit for controlling an address for reading out the image signal from said image memory to compensate the movement of the image according to the movement vectors detected by said movement detection means.

24. A device according to claim 19, wherein a frequency characteristic of said filter means is adaptively determined in accordance with the movement of the image detected by said movement detection means.

* * * * *